(12) United States Patent
Bergeron et al.

(10) Patent No.: US 11,125,185 B2
(45) Date of Patent: Sep. 21, 2021

(54) ENGINE ASSEMBLY WITH HEAT MANAGEMENT SYSTEM

(71) Applicant: PRATT & WHITNEY CANADA CORP., Longueuil (CA)

(72) Inventors: Sebastien Bergeron, Chambly (CA); Etienne Plamondon, Candiac (CA); Andre Julien, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 27 days.

(21) Appl. No.: 16/263,113

(22) Filed: Jan. 31, 2019

(65) Prior Publication Data

US 2020/0248648 A1   Aug. 6, 2020

(51) Int. Cl.
| | |
|---|---|
| F02G 5/02 | (2006.01) |
| F01C 1/22 | (2006.01) |
| F01P 3/12 | (2006.01) |
| F01P 3/20 | (2006.01) |
| F01P 5/12 | (2006.01) |
| F01P 5/14 | (2006.01) |
| F02B 3/06 | (2006.01) |
| F02C 7/12 | (2006.01) |

(52) U.S. Cl.
CPC ............... *F02G 5/02* (2013.01); *F01C 1/22* (2013.01); *F01P 3/12* (2013.01); *F01P 3/20* (2013.01); *F01P 5/12* (2013.01); *F01P 5/14* (2013.01); *F02B 3/06* (2013.01); *F02C 7/12* (2013.01)

(58) Field of Classification Search
CPC ....... F02G 5/02; F01P 3/12; F01P 3/20; F01P 5/14; F01P 5/12; F01P 5/10; F01P 7/14; F01P 11/00; F01P 2005/125; F02C 7/12; F02C 7/16; F01C 1/22; F01C 21/06; F02B 3/06; F05D 2220/50; F05D 2260/205; F02N 19/10
USPC ......... 123/41.01, 41.02, 41.08, 41.42, 41.44; 244/53 R, 57, 58
See application file for complete search history.

(56) References Cited

U.S. PATENT DOCUMENTS

| | | | | |
|---|---|---|---|---|
| 5,095,855 A | * | 3/1992 | Fukuda | F01P 3/20 123/41.1 |
| 5,553,461 A | * | 9/1996 | Hitzigrath | B64D 13/00 62/150 |
| 7,451,753 B2 | * | 11/2008 | Bell | F02C 7/224 123/196 R |
| 7,793,856 B2 | | 9/2010 | Hernandez et al. | |

(Continued)

FOREIGN PATENT DOCUMENTS

| | | |
|---|---|---|
| EP | 3112271 A1 | 1/2017 |
| EP | 3163052 A1 | 5/2017 |

OTHER PUBLICATIONS

European Search Report issued in counterpart EP application No. 20154995 dated Jun. 29, 2020.

*Primary Examiner* — Hoang M Nguyen
(74) *Attorney, Agent, or Firm* — Norton Rose Fulbright Canada LLP

(57) ABSTRACT

There is disclosed an engine assembly for an aircraft, including: a combustion engine including a coolant circuit in heat exchange relationship with a heat sink, the heat sink including a heat exchanger and at least one component, the at least one component having a main function that differs from thermal exchange. A method of operating the system is also disclosed.

20 Claims, 3 Drawing Sheets

(56) References Cited

U.S. PATENT DOCUMENTS

| | | | |
|---|---|---|---|
| 8,196,553 B2* | 6/2012 | Kline | F01P 5/12 |
| | | | 123/41.01 |
| 8,196,862 B2* | 6/2012 | Brooks | F02B 29/0412 |
| | | | 123/559.1 |
| 8,689,741 B2 | 4/2014 | Park et al. | |
| 8,997,467 B2 | 4/2015 | Grzesiak et al. | |
| 9,096,207 B2 | 8/2015 | Madurai Kumar et al. | |
| 2004/0103862 A1 | 6/2004 | Aidnik | |
| 2008/0185924 A1* | 8/2008 | Masoudipour | H02K 5/20 |
| | | | 310/54 |
| 2012/0098679 A1* | 4/2012 | Bethel | G01C 23/00 |
| | | | 340/973 |
| 2014/0283764 A1* | 9/2014 | Abou-Nasr | F01P 7/162 |
| | | | 123/41.02 |
| 2014/0373533 A1* | 12/2014 | Jensen | F22B 1/28 |
| | | | 60/612 |
| 2017/0248065 A1* | 8/2017 | Liu | F02B 37/00 |
| 2017/0248076 A1 | 8/2017 | Dierksmeier et al. | |
| 2018/0112664 A1* | 4/2018 | De Bock | F04C 18/086 |
| 2018/0320577 A1 | 11/2018 | Eisenschenk et al. | |

\* cited by examiner

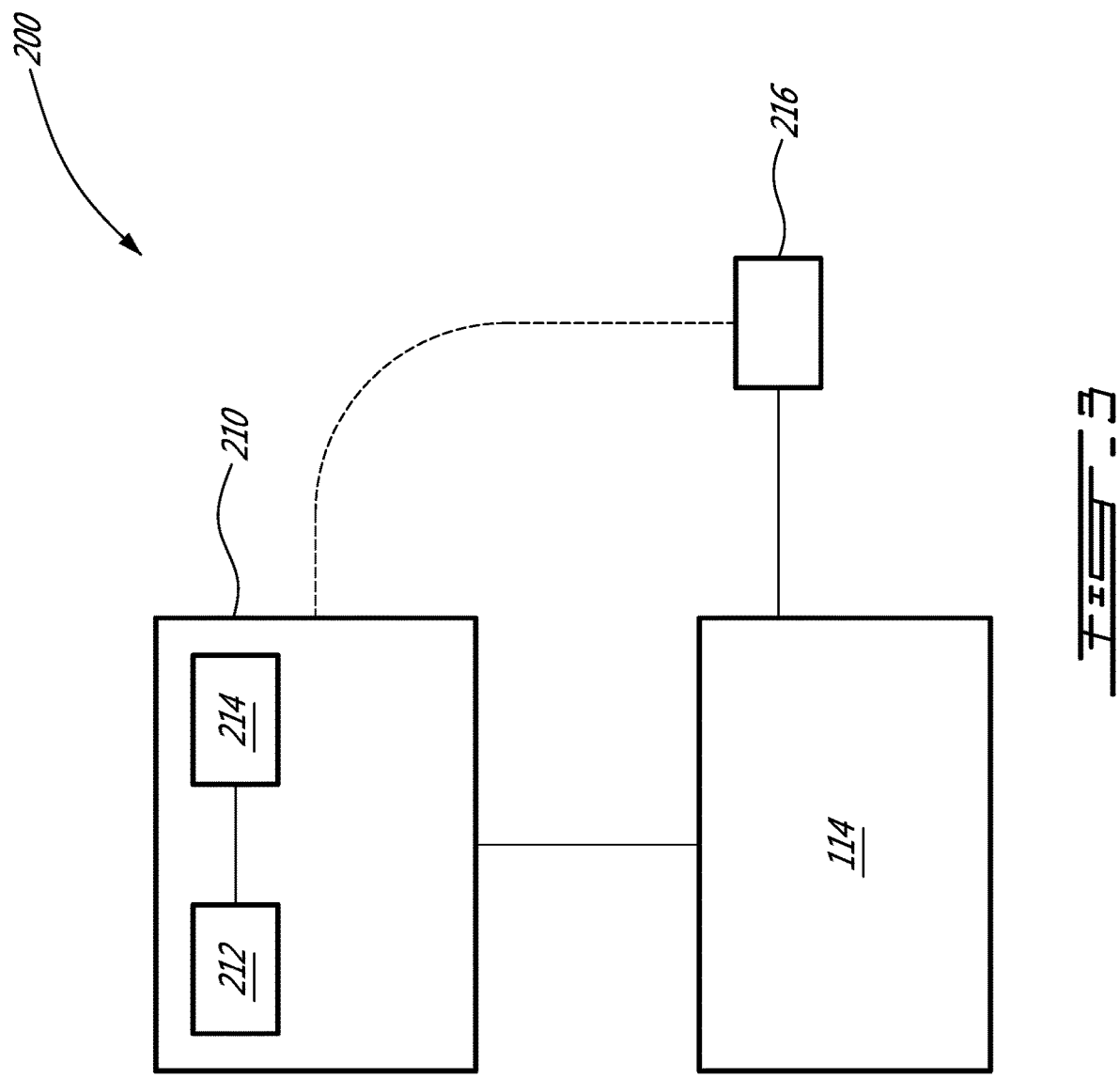

ENGINE ASSEMBLY WITH HEAT MANAGEMENT SYSTEM

TECHNICAL FIELD

The application relates generally to aircraft engines and, more particularly, to systems and methods for managing heat generated by such engines.

BACKGROUND OF THE ART

Performance of aircraft engines during start-up are not as good as during steady state operation because the various engine components and fluids are not at their optimal operational temperatures. After the aircraft engine is shut-down, a substantial amount of time lapses before the engine cools down. Moreover, it is a constant challenge to provide sufficient cooling to the hot components of an aircraft engine. Improvements are therefore suitable.

SUMMARY

In one aspect, there is provided an engine assembly for an aircraft, comprising: a combustion engine including a coolant circuit in heat exchange relationship with a heat sink, the heat sink including a heat exchanger and at least one component, the at least one component having a main function that differs from thermal exchange.

In another aspect, there is provided a method of operating a heat management system of an engine assembly for an aircraft, comprising: circulating a liquid coolant; transferring heat from a combustion engine of the engine assembly to a liquid coolant; and transferring heat from the liquid coolant to an environment outside the engine assembly via both of a heat exchanger and a component whose main function differs from thermal exchange.

In yet another aspect, there is provided a method of operating a heat management system of an engine assembly for an aircraft, the engine assembly including a combustion engine being liquid cooled with a liquid coolant, the method comprising: determining that the combustion engine of the engine assembly is off; circulating the liquid coolant in a coolant circuit for heating the liquid coolant; and circulating the heated liquid coolant toward at least one component whose main function differs from thermal exchange for transferring heat from the heated liquid coolant to the at least one component.

DESCRIPTION OF THE DRAWINGS

Reference is now made to the accompanying figures in which:

FIG. 3 is a schematic view of a control system for the engine assembly of FIG. 2.

DETAILED DESCRIPTION

Figure 1:
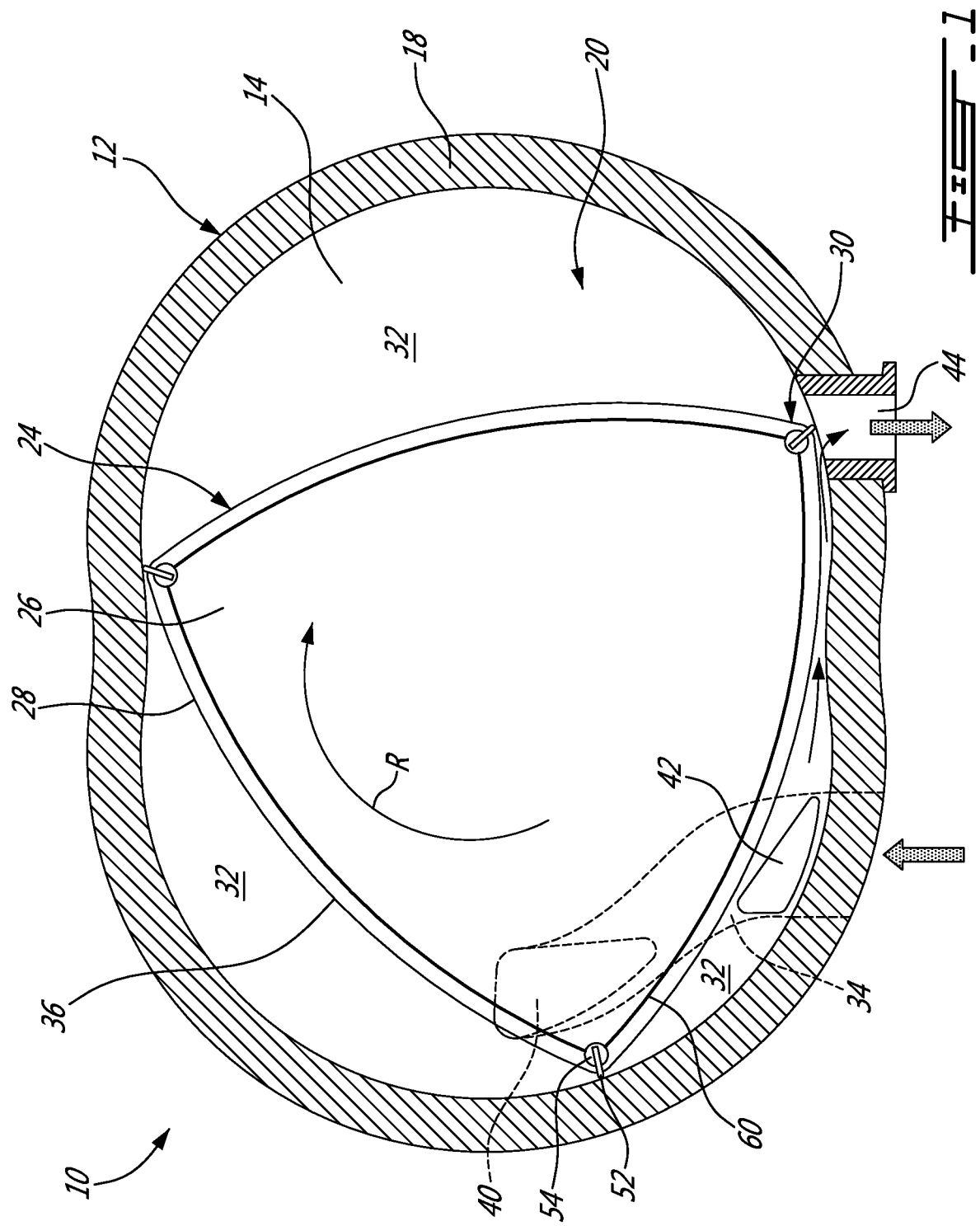
FIG. 1 is a schematic cross-sectional view of a rotary internal combustion engine in accordance with a particular embodiment.

Referring to FIG. 1, a rotary internal combustion engine 10 known as a Wankel engine is schematically shown. The rotary engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the inner rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective end wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent end wall 14. Alternate sealing arrangements are also possible.

Although not shown in the Figures, the rotor 24 is journaled on an eccentric portion of a shaft such that the shaft rotates the rotor 24 to perform orbital revolutions within the stator cavity 20. The shaft rotates three times for each complete rotation of the rotor 24 as it moves around the stator cavity 20. Oil seals are provided around the eccentric to impede leakage flow of lubricating oil radially outwardly thereof between the respective rotor end face 26 and outer body end wall 14. During each rotation of the rotor 24, each chamber 32 varies in volumes and moves around the stator cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port 42 also in communication with the source of air (e.g. a compressor) and located between the inlet and exhaust ports 40, 44. The ports 40, 42, 44 may be defined in the end wall 14 of in the peripheral wall 18. In the embodiment shown, the inlet port 40 and purge port 42 are defined in the end wall 14 and communicate with a same intake duct 34 defined as a channel in the end wall 14, and the exhaust port 44 is defined through the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 2:
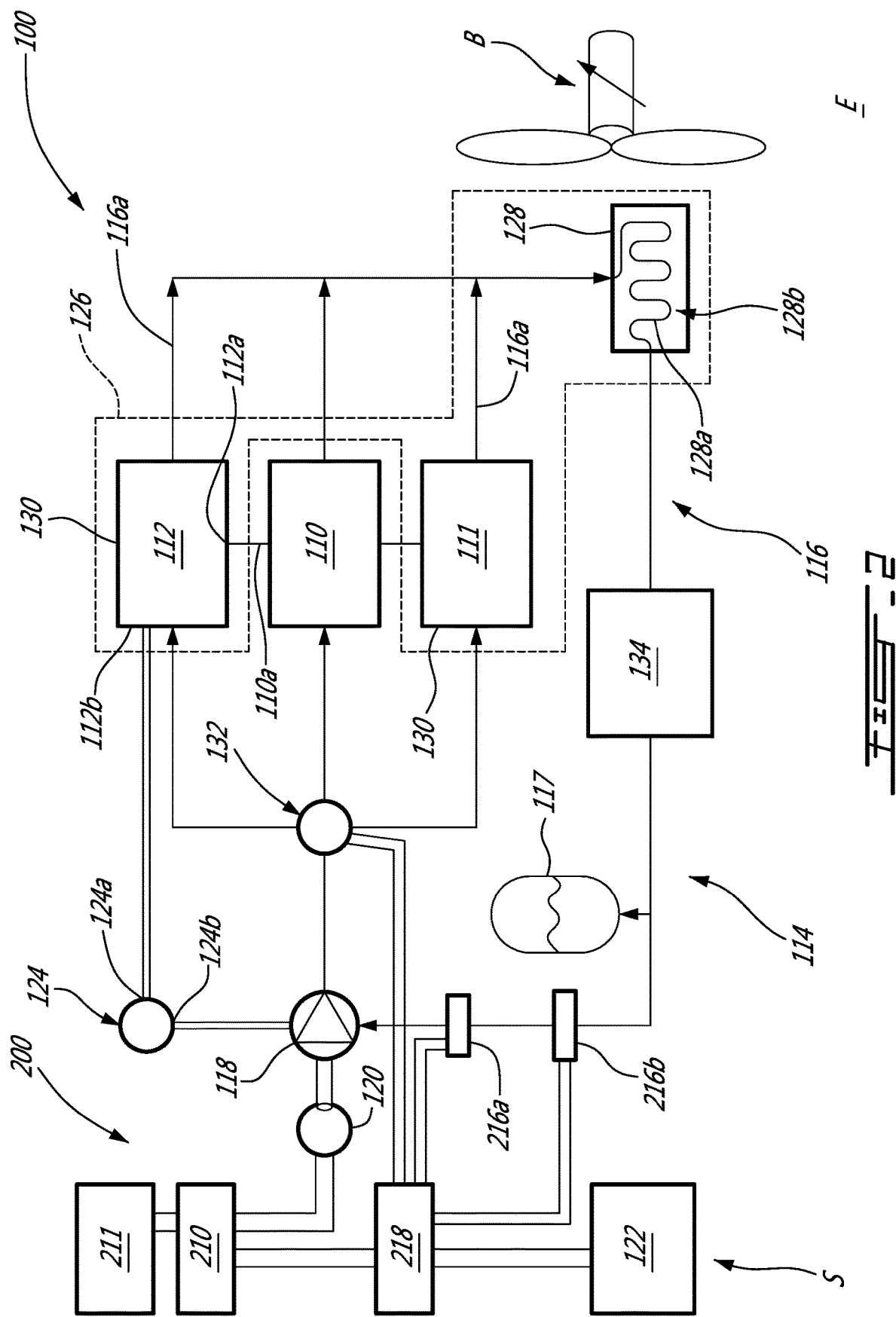
FIG. 2 is a schematic view of an engine assembly in accordance with one embodiment.

Referring now to FIG. 2, an engine assembly is generally shown at 100. The engine assembly 100 may be an auxiliary power unit of an aircraft. The engine assembly 100 includes an internal combustion engine 110, which may be the rotary engine 10 described herein above with reference to FIG. 1. Alternatively, the internal combustion engine 110 may be any suitable engine. The internal combustion engine 110 may be a reciprocating engine, such as a piston engine. In a particular embodiment, the internal combustion engine 110 may be part of an engine system being a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein.

The internal combustion engine 110 is fluidly connected to an engine inlet 111, which is fluidly connected to an environment E outside the engine assembly 100.

In the embodiment shown, the engine assembly 100 includes a gearbox 112 in driving engagement with the internal combustion engine 110. More specifically, the internal combustion engine 110 has an engine shaft 110a that is connected to an input 112a of the gearbox 112. The gearbox 112 may be connected to a plurality of components to transmit a rotational input from the engine shaft 110a. The gearbox 112 may create a rotational speed ratio between its input 112a and its output 112b.

In the embodiment shown, the engine assembly 100 includes a heat management system 114. The heat management system 114 includes a coolant circuit 116 configured for circulating a liquid coolant. The coolant circuit 116 is in heat exchange relationship with the internal combustion engine 110. In a particular embodiment, the internal combustion engine 110 includes a housing, such as the peripheral wall 18 of the rotary engine of FIG. 1, that defines conduits therein; the conduits being fluidly connected to the coolant circuit 114. The liquid coolant might be able to cool the internal combustion engine 110 by picking up heat from its housing, via convection. Consequently, a temperature of the liquid coolant increases following its passage through the housing.

For inducing a flow of the liquid coolant within the coolant circuit 116, the engine assembly 100 includes a pump 118 fluidly connected to the coolant circuit 116. The pump 118 may be drivingly engaged by the internal combustion engine 110 and/or by an electric motor 120, which is powered by a power source S. In a particular embodiment, the power source S is a battery 122. Alternatively, the power source S may be a generator drivingly engaged by either the internal combustion engine 110 or by another engine of an aircraft containing the engine assembly 100.

In the embodiment shown, the heat management system 114 includes an expansion tank 117 fluidly connected to the coolant circuit 116. The expansion tank 117 may be pressurized at a given pressure, which may be 35 PSI, and may be used for catering for thermal-induced volume variations of the liquid coolant.

In certain situations, it might be useful to circulate the liquid coolant in the coolant circuit 116 when the internal combustion engine 110 is powered off, shutdown, or off. Herein, by being powered off, shutdown, or off implies that the internal combustion engine does not induce rotation of the engine shaft 110a. In other words, by being powered off, shutdown, or off, there is no combustion occurring in the combustion chamber(s) of the internal combustion engine 110.

In the embodiment shown, the pump 118 is selectively drivingly engaged by the internal combustion engine 110 or the electric motor 120. In the depicted embodiment, the pump 118 is drivingly engaged by the internal combustion engine via the gearbox 112.

To allow the pump 118 to be engaged by the electric motor 120, the engine assembly 100 includes a clutch 124 having an input 124a being in driving engagement with the internal combustion engine 110 via the gearbox 112 and an output 124b being in driving engagement with the pump 118. The clutch 124 is operable in a first configuration in which the input 124a is in driving engagement with the output 124b and a second configuration in which the input 124a is disengaged from the output 124b. Consequently, in the first configuration, the internal combustion engine 110 drives the pump 118 and, in the second configuration, the internal combustion engine 110 is disengaged from the pump 118. By being in the second configuration, the clutch 124 allows the electric motor 120 to drive the pump 118 without having to overcome a load created by the internal combustion engine 110 being off.

In a particular embodiment, the clutch 124 is a sprag clutch. In the sprag clutch, the input 124a drivingly engages the output 124b if the input 124a rotates at a greater speed than that of the output 124b and allows the output 124b to rotate independently of the input 124a if the output 124b rotates at a speed greater than that of the input 124a.

The heat management system 114 further includes a heat sink 126 in heat exchange relationship with the coolant circuit 116. In the embodiment shown, the heat sink 126 includes a heat exchanger 128. The heat generated by said engine 110 has to be dissipated in the environment E. The heat exchanger 128 might be used for that purpose.

More specifically, and in the embodiment shown, the heat exchanger 128 includes at least one first conduit 128a and at least one second conduit 128b in heat exchange relationship with the at least one first conduit 128b. The at least one first conduit 128a is fluidly connected to the coolant circuit 116 and the at least one second conduit 128b is fluidly connected to the environment E. A blower B may be used to induce a flow of air from the environment E through the at least one second conduit 128b of the heat exchanger 128. In a particular embodiment, the blower B may be replaced by a scoop located on an external surface of the aircraft. A temperature of the air in the environment E is usually lower than a temperature of the liquid coolant that picked up heat from the internal combustion engine 110. Consequently, a heat transfer occurs from the liquid coolant to the environment E within the heat exchanger 128.

Managing heat of the internal combustion engine 110 is always a challenge. Therefore, it might be advantageous to help the heat exchanger 128 in dissipating the heat generated by combustion occurring in the combustion chamber(s) of the internal combustion engine 110.

In the embodiment shown, the heat sink 126 further includes at least one component 130 of the engine assembly 100. The component 130 is thermally disconnected from the heat exchanger 128. Herein, thermally disconnected implies that the component 130 does not rely on the heat exchanger for being cooled. Stated otherwise, the component 130, contrary to the internal combustion engine 110, is not liquid cooled. Again, in other words, when the internal combustion engine 110 is on and combustion occur in the chamber(s), a temperature of said engine 110, more specifically of the liquid coolant exiting said engine 110, is greater than that of the component 130. Hence, a heat transfer might occur from the liquid coolant that has been heated by the internal combustion engine 110 to the component 130. The at least one main component 130 has a main function that is different than exchanging heat. That is, the main purpose of the inclusion of the at least one component 130 in the engine assembly is to carry a function that is not related to cooling/heating.

The component 130 may then dissipate the heat it received from the internal combustion engine 110 via the liquid coolant to the environment E. In a particular embodiment, the component 130 is air cooled by ambient air circulating within a compartment of the aircraft containing the engine assembly 100. In a particular embodiment, the compartment is an APU compartment of the aircraft.

In the embodiment shown, the at least one component 130 includes two components being the gearbox 112 and the engine inlet 111. The at least one component 130 may be either of the gearbox 112, the engine inlet 111, a compressor, a turbine, and so forth. In the embodiment shown, the component 130 is operatively connected to the internal combustion engine 110. It is understood that the component 130 need not be operatively connected to the internal combustion engine 110. The component 130 may be any other component of the aircraft. For instance, the component 130 may be an engine starter, a generator, a load compressor, an air filter, an actuators, a valve, any component having at least one moveable part, a Line Replacement Unit (LRU), and so on. In a particular embodiment, having the at least one component 130 being the engine inlet 111 allows to de-ice, or prevent ice from accumulating on, said inlet 111. All of the above listed possibilities of the at least one component 130 have a main function that differs from thermal exchange. For instance, the main function of the engine starter is to start the engine, that of the generator is to produce electricity, that of the load compressor is to compress air for a cabin of an aircraft equipped with the engine assembly, that of the actuators is to move another component, that of the valve is to allow or block fluid communication between two components, that of the compressor is to compress air before it is fed to the combustion engine, that of the turbine is to extract energy from combustion gases exiting the combustion engine.

In the embodiment shown, the coolant circuit 116 includes a conduit 116a that is in heat exchange relationship with the at least one component 130. The conduit 116a may be in contact with the component 130 such that the conduit 116a is conductively thermally connected with with the component 130. Herein, conductively thermally connected implies that heat is transferred between the conduit 116a and the component 130 via conduction. The conduit 116a may be wrapped around the component 130. The conduit 116a may be simply in contact with the component 130 or secured thereto with any suitable mean, such as by welding. Alternatively, or in combination, channels may be defined in the component 130 for fluidly receiving the liquid coolant. Stated otherwise, cooling chambers and channels may be located around the component 130.

In a particular embodiment, the conduit 116a may be selectively connected to a remainder of the coolant circuit 116. In other words, a valve 132 may be located on the coolant circuit 116. The valve 132 may be operated in a first mode in which it allows the liquid coolant to circulate within the conduit 116b and a second mode in which it prevents the liquid coolant to flow within the conduit 116b. This might allow to selectively use the component 130 to help the heat exchanger 128 in dissipating the heat generated by the internal combustion engine 110 when needed. Having the ability to fluidly disconnect the conduit 116b from the remainder of the coolant circuit 116 might allow the pump to consume less energy because it does not have to overcome a pressure drop that might occur by circulating the liquid coolant within the conduit 116b.

In some flight phases, the internal combustion engine 110 has to be powered on after being exposed to very cold ambient temperatures for prolonged time. It might be advantageous to warm-up certain components of the engine assembly 110 prior to starting the internal combustion engine 110. More specifically, if the engine assembly 100 is an APU, the internal combustion engine 110 is off for substantially a whole of a cruise phase. When shifting to an approach phase prior to landing, power to main engines of the aircraft is reduced and, consequently, they might not be able to provide all the electricity and compressed air required by the aircraft. Then, the APU is powered on to generate that electricity and compressed air that was previously generated by the main engines during cruise. However, starting the engine 110 in such cold operating conditions might require a relatively long warm up period during which efficiency of the engine assembly 110 is less than its nominal, or steady state efficiency. This might imply that the internal combustion engine 110 consumes more fuel during the warm up phase than during a steady state operation phase. It might be advantageous to reduce a duration of the warm up phase to reduce fuel consumption of the engine 110.

In the embodiment shown, the engine assembly 100 includes a heat source 134 being in heat exchange relationship with the coolant circuit 116 for heating the liquid coolant circulating therethrough and, as will be discussed below, for heating the component 130 prior to powering on the engine 110. The heat source 134 may be an electric heater operatively connected to the power source S. The heat source 134 may be another heat exchanger of the aircraft. Any suitable heat source may be used without departing from the scope of the present disclosure.

In some other flight phases, the internal combustion engine 110 has to be powered off. However, when the internal combustion engine 110 has been operating for a prolonged amount of time, it might be very hot. It might be advantageous to continue circulating the liquid coolant to cool down the internal combustion engine 110 after it has been powered off.

In the embodiment shown, after the internal combustion engine 110 has been powered off, the pump 118 may continue to be operated using the electric motor 120. Continuing to circulate the liquid coolant after the engine 110 is powered off might decrease a cool down time compared to a configuration in which the liquid coolant stops circulating in the coolant circuit after the engine 110 is shut down. Dissipating the heat via both of the component 130 and the heat exchanger 128 might decrease the cool down time compared to a configuration in which only the heat exchanger 128 is used to dissipate the heat of the internal combustion engine 110. In a particular embodiment, decreasing the cool down time increases a lifetime of the engine. Decreasing the cool down time might allow to reduce the fuel consumption because the engine does not have to run for as long for achieving the same decrease in temperature.

For operating the heat management system 114, the liquid coolant is circulated. Heat is transferred from the internal combustion engine 110 to the liquid coolant. The heat is transferred from the liquid coolant to the environment E outside the engine assembly 100 via both of the heat exchanger 128 and the component 130 that is thermally disconnected from the heat exchanger 128.

In the embodiment shown, transferring the heat to the environment E via the component 130 includes transferring heat to the gearbox 112 of the engine assembly 100. In the embodiment shown, transferring the heat to the environment E via the component 130 includes transferring the heat to the component 130 which is operatively connected to the internal combustion engine 110.

In the depicted embodiment, circulating the liquid coolant includes actuating the pump 118 with one of the electric motor 120 and the engine shaft 110a of the internal combustion engine 110. Actuating the pump with the electric motor 118 may include disengaging the engine shaft 110a from the pump 118.

Referring now to FIGS. 2-3, a control system for controlling the heat management system 116 is generally shown at 200. The control system 200 includes a controller 210 including a processor 212 and a computer readable medium 214 operatively connected to the processor 212 and having stored thereon instructions executable by the processor 212 for controlling the heat management system 116. As shown, the controller 210 is operatively connected to an aircraft bus 211, which may be a 28V bus.

The controller 200 is configured for determining that the internal combustion engine 110 of the engine assembly 100 is off, circulating the liquid coolant in the coolant circuit 116 for heating the liquid coolant, and circulating the heated liquid coolant toward the at least one component 130 being thermally disconnected from the heat exchanger 128 of the engine assembly 100 for transferring heat from the heated liquid coolant to the at least one component 130.

In a particular embodiment, determining that the internal combustion engine 110 is off includes determining that the internal combustion engine 110 is cold. In such a case, heating the liquid coolant includes heating the liquid coolant with the heat source 134. The heated liquid coolant may then be used for heating the engine 110 and the component 130.

In a particular embodiment, determining that the internal combustion engine 110 is off includes determining that the internal combustion engine 110 is hot, or above a given temperature. In such a case, heating the liquid coolant includes transferring heat from the internal combustion engine 110 to the liquid coolant.

In a particular embodiment, determining that the internal combustion engine 110 is off further includes determining that the engine assembly 100 is below a given temperature. Alternatively, determining that the internal combustion engine 110 is off further includes determining that a flight phase of the aircraft is an approach phase and that the engine 110 needs to be started.

In a particular embodiment, the controller 210 is operatively connected to at least one sensor 216. As shown in FIG. 2, the at least one sensor 216 includes a coolant temperature sensor 216a and a coolant pressure sensor 216b both of which may be operatively connected to an engine control unit (ECU) 218. As shown, the engine control unit 218 is operatively connected to the controller 210. The coolant temperature sensor 216a may be used for monitoring a temperature of the component 130 whereas the coolant pressure sensor 216b may be used for monitoring a pressure of the coolant. The controller 210 may start the circulation of the liquid coolant and the actuation of the heat source 134 to warm the component 130 if one or both of the monitored temperature and the monitored pressure reaches a respective given threshold.

As illustrated on FIG. 2, the engine control unit 218 is operatively connected to the power source S. As shown, the controller 210 is operatively connected to the power source S via the engine control unit 218.

The valve 132 is operatively connected to the engine control unit 218 and to the controller 210. In other words, the valve 132 is operatively connected to the controller 210 via the engine control unit 218. In the embodiment shown, the pump 118 is electrically driven to turn ON/OFF pumping at any time to warm up or cool down the hardware (e.g., engine 110) when the engine 110 is shut down. The valve, or control valve, 132 may offer the possibility to allow the coolant fluid to flow as needed in specific engine modules before engine start, in operation and after shutdown. Depending of the temperature and pressure of the coolant and the engine state, the ECU 218 might have a logic to open up the required cooling channels. Multiple temperature sensing points may be used.

In one embodiment, the control system 200 may monitor critical components temperature during flight and turn ON the pump 118 as needed to warm up.

In a particular embodiment, depending of the application, the cooling pump 118 can be driven with a direct mechanical driving shaft that takes over the electrical motor 120 when the engine 110 is started using the sprag clutch 124 to engage and disengaged the driving shaft.

In a particular embodiment, having the ability to warm up or cool down components, such as the gearbox 112, the engine inlet 111, and the engine 110 itself while said engine 110 is powered off might allow the reduction of the cool down time after shutting down the engine 110, which might allow for fuel savings. It might allow to decrease a time to warm up the engine 110 before it is started. It might decrease thermal stress and the wear of mechanical components of the engine (e.g., gears, bearings, etc) when starting the engine 110. It might reduce a drag and improve lubrication of components of the engine during the warming up. This system 114 may be a single system to warm up and/or cool down the different engine systems such as the gearbox, the housing of the engine 110 and so on.

The above description is meant to be exemplary only, and one skilled in the art will recognize that changes may be made to the embodiments described without departing from the scope of the invention disclosed. For instance, the heat management system disclosed herein may be used in a turboshaft, a turboprop, and a turbofan engine. Still other modifications which fall within the scope of the present invention will be apparent to those skilled in the art, in light of a review of this disclosure, and such modifications are intended to fall within the appended claims.

The invention claimed is:

1. An engine assembly for an aircraft, comprising: a combustion engine; a coolant circuit, the combustion engine in heat exchange relationship with a heat sink via the coolant circuit, the heat sink including a heat exchanger and at least one further component of the engine assembly, the at least one further component having a main function that differs from thermal exchange and is distinct from the combustion engine, a conduit of the coolant circuit wrapped around the at least one further component, the conduit in heat exchange relationship with the at least one further component; and a valve having a first mode in which the conduit of the coolant circuit is fluidly connected to a remainder of the coolant circuit and a second mode in which the conduit of the coolant circuit is disconnected from the remainder of the coolant circuit, the valve being in the first mode when the combustion engine is powered off for cooling down the combustion engine, the valve being in the second mode when the combustion engine is powered on.

2. The engine assembly of claim 1, wherein the conduit is in contact with the at least one further component, the conduit conductively thermally connected with the at least one further component.

3. The engine assembly of claim 1, wherein the conduit is selectively connectable to a remainder of the coolant circuit.

4. The engine assembly of claim 1, wherein the at least one further component is selected from a group consisting of a gear box, an inlet, a compressor, a turbine, a generator, an engine starter, a load compressor, an air filter, an actuator, and a valve.

5. The engine assembly of claim 1, wherein the at least one further component is operatively connected to the combustion engine.

6. The engine assembly of claim 1, further comprising a heat source in heat exchange relationship with the coolant circuit and with the at least one further component.

7. The engine assembly of claim 1, wherein the coolant circuit includes a pump drivingly engaged with an engine shaft of the combustion engine to induce a flow of a liquid coolant in the coolant circuit.

8. The engine assembly of claim 1, wherein the coolant circuit includes a pump selectively drivingly engaged by an electric motor operatively connected to a power source or by an engine shaft of the combustion engine.

9. The engine assembly of claim 8, further comprising a clutch having an input drivingly engaged by the engine shaft and an output in driving engagement with the pump, the clutch operable in a first configuration in which the input is in driving engagement with the output and a second configuration in which the input is disengaged from the output.

10. The engine assembly of claim 1, wherein the combustion engine is a reciprocating engine.

11. A method of operating a heat management system of an engine assembly for an aircraft, comprising:
    circulating a liquid coolant;
    transferring heat from a combustion engine of the engine assembly to the liquid coolant;
    shutting down the combustion engine; and
    transferring heat from the liquid coolant to an environment outside the engine assembly via both of a heat exchanger and a component whose main function differs from thermal exchange after the shutting down of the combustion engine, the component distinct from the combustion engine, the transferring of the heat to the environment via the component includes flowing the liquid coolant around the component thereby conductively transferring the heat from the liquid coolant to the component.

12. The method of claim 11, wherein transferring heat to the environment via the component includes transferring heat to a gearbox of the engine assembly.

13. The method of claim 11, wherein transferring heat to the environment via the component includes transferring heat to the component being operatively connected to the combustion engine.

14. The method of claim 11, wherein circulating the liquid coolant includes actuating a pump with one of an electric motor and an engine shaft of the combustion engine.

15. The method of claim 14, wherein actuating the pump with the electric motor includes disengaging the engine shaft from the pump.

16. A method of operating a heat management system of an engine assembly for an aircraft, the engine assembly including a combustion engine being liquid cooled with a liquid coolant, the method comprising:
    determining that the combustion engine of the engine assembly is off;
    circulating the liquid coolant in a coolant circuit for heating the liquid coolant while the combustion engine is off;
    and
    circulating the heated liquid coolant around at least one component whose main function differs from thermal exchange for conductively transferring heat from the heated liquid coolant to the at least one component while the combustion engine is off, the component distinct from the combustion engine.

17. The method of claim 16, wherein determining that the combustion engine is off includes determining that the combustion engine is cold, heating the liquid coolant includes heating the liquid coolant with a heat source.

18. The method of claim 16, wherein determining that the combustion engine is off includes determining that the combustion engine is hot, heating the liquid coolant includes transferring heat from the combustion engine to the liquid coolant.

19. The method of claim 16, wherein determining that the combustion engine of the engine assembly is off further includes determining that the engine assembly is below a given temperature.

20. The method of claim 16, wherein determining that the combustion engine of the engine assembly is off further includes determining that a flight phase of the aircraft is an approach phase.

\* \* \* \* \*